United States Patent [19]

Roll et al.

[11] Patent Number: 5,513,294

[45] Date of Patent: Apr. 30, 1996

[54] METHOD OF FORMING OPTICAL FIBER CONNECTORS

[75] Inventors: Richard A. Roll, West Trenton; Muhammed A. Shahid, Ewing Township, Mercer County, both of N.J.

[73] Assignee: AT&T Corp., Murray Hill, N.J.

[21] Appl. No.: 352,011

[22] Filed: Dec. 8, 1994

[51] Int. Cl.⁶ ................................................. G02B 6/36
[52] U.S. Cl. ............................ 385/137; 385/147; 901/47
[58] Field of Search ................................ 385/59, 65, 71, 385/72, 80, 83, 134, 136, 137, 147; 901/40, 41, 47

[56] References Cited

U.S. PATENT DOCUMENTS

| | | | |
|---|---|---|---|
| 4,744,627 | 5/1988 | Chande et al. | 385/137 |
| 4,818,058 | 4/1989 | Bonanni | 350/96.20 |
| 5,185,846 | 2/1993 | Basavanhally et al. | 385/137 |
| 5,259,051 | 11/1993 | Burack et al. | 385/76 |
| 5,268,981 | 12/1993 | Shahid | 385/71 |
| 5,287,426 | 2/1994 | Shahid | 385/85 |
| 5,388,174 | 2/1995 | Roll et al. | 385/80 |

FOREIGN PATENT DOCUMENTS 63-113508   5/1988   Japan ................................ 385/137

*Primary Examiner*—John D. Lee
*Attorney, Agent, or Firm*—Lester H. Birnbaum

[57] ABSTRACT

An improved method is provided for applying optical fiber support members (17, 18) to a pair of fixtures such as vacuum chucks (24, 25) such that the fixtures can thereafter be used to clamp the support members to opposite sides of an array of optical fibers (14). The improvement comprises arranging the optical fiber support members in a magazine (29, 30) and bringing the two fixtures into proximity with a magazine. Automatic apparatus (33, 34) is used for urging a pair of optical fiber support members from the magazine onto the two fixtures such that the support members adhere to the fixtures. After placement of the support members on the fibers, the cycle is repeated.

19 Claims, 4 Drawing Sheets

METHOD OF FORMING OPTICAL FIBER CONNECTORS

TECHNICAL FIELD

This invention relates to optical fiber interconnections and, more particularly, to techniques for automatically placing connector members on optical fibers.

BACKGROUND OF THE INVENTION

The copending application of Roll et al., Ser. No. 08/186,935, filed Jan. 27, 1994 now U.S. Pat. No. 5,388,174, describes a method for making plastic optical fiber connectors, and for applying such connectors to parallel arrays of optical fibers supported on a plastic substrate, such as an optical fiber ribbon or an optical backplane. Each optical fiber connector comprises a pair of plastic support members bonded on opposite sides of a parallel array of optical fibers such that each optical fiber is supported in matching V-grooves of the two support members. The ends of the fibers are precisely located by the connector, which permits them to be abutted or connected to the ends of fibers of another array.

The Roll et al. application describes how optical fiber support members can be held in vacuum chucks for automatic placement on opposite sides of an array of optical fibers. Alignment projections and apertures in the two support members and in the two vacuum chucks permit the chucks to be oriented on opposite sides of the optical fibers such that the V-grooves of the support members are accurately clamped on opposite sides of each optical fiber. Making the support members of plastic permits alignment projections and apertures to be formed in them and also permits their convenient placement in the vacuum chucks.

While the purpose of the Roll et al. application is to automate the placement of support members on optical fiber ribbon arrays, one still must manually install the support members in the vacuum chucks. If one could automate the installation of the plastic support members in the vacuum chucks, one could further automate the process of "connectorizing" optical fiber arrays.

SUMMARY OF THE INVENTION

In one embodiment of the invention, an improved method is provided for applying optical fiber support members to a pair of fixtures, such as vacuum chucks, so that the fixtures can thereafter be used to clamp the support members to opposite sides of an array of fibers. The improvement comprises arranging the optical fiber support members in a magazine and bringing the two fixtures into proximity with a magazine. Automatic apparatus is used for urging a pair of optical fiber support members from the magazine onto the two fixtures such that the support members adhere to the fixtures. After placement of the support members on the fibers, the cycle is repeated.

The optical fiber support members are preferably arranged in pairs, with the grooves of each pair of support members facing each other. An arm projects into the magazine during each cycle of operation to move a pair of the support members from the magazine to a space between the two fixtures. The fixtures are preferably vacuum chucks, and a vacuum is next applied to fix each of the two optical fiber support members to each of the two fixtures. After each cycle, the arm is withdrawn from the magazine, allowing the remaining optical fiber support members in the magazine to move vertically downwardly by gravity, thus positioning the next pair of support members for the following cycle. Consequently, a plurality of pairs of fiber support members are supplied for fixing to various optical fiber arrays automatically and without any human intervention. The process can further be automated by using two magazines for supplying optical fiber support members to each pair of fixtures, as will be described later.

These and other objects, features and advantages of the invention will be better understood from a consideration of the following detailed description taken in conjunction with the accompanying drawing.

DETAILED DESCRIPTION

Figure 1:
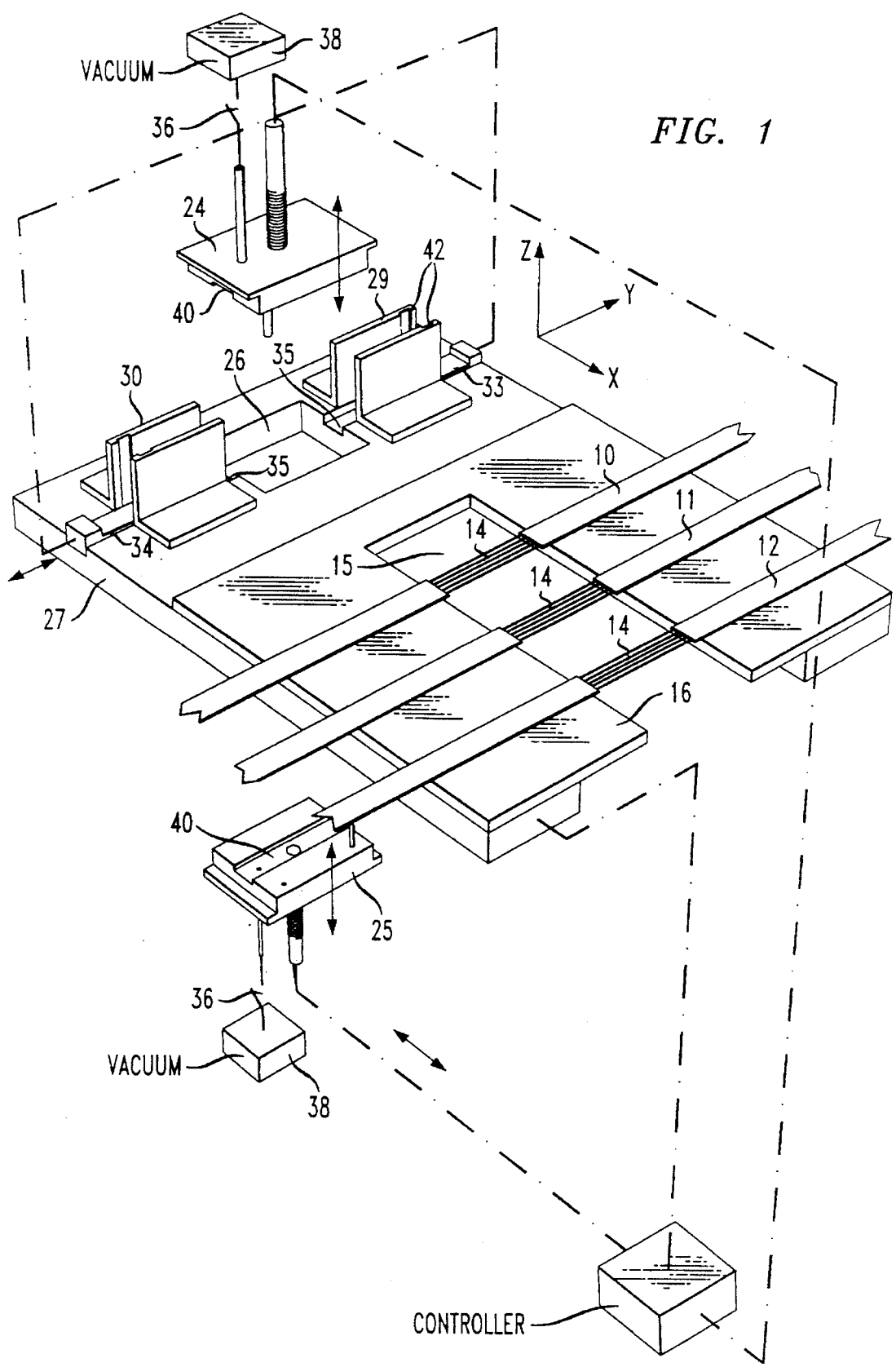
FIG. 1 is a schematic perspective view of apparatus for applying connectors to optical fiber ribbons in accordance with one embodiment of the invention.

Referring now to FIG. 1, there is shown apparatus for applying optical fiber connectors to optical fiber arrays defined in optical fiber ribbons 10, 11 and 12. Each optical fiber array comprises an array of optical fibers 14 held in place by a plastic encapsulation. As is described in the aforementioned Roll et al. application, preparatory to applying the connectors, portions of the fiber ribbon encapsulations are removed to reveal the parallel arrays of optical fibers 14 held by each ribbon. The arrays are then arranged to extend in a parallel direction, as shown, across an opening 15 in a plate 16.

Figure 2:
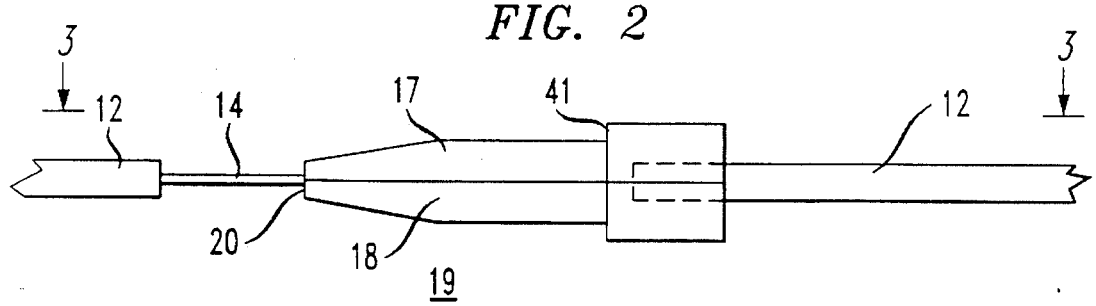
FIG. 2 is a side view of an optical fiber connector placed on a fiber array by the apparatus of FIG. 1.
Figure 3:
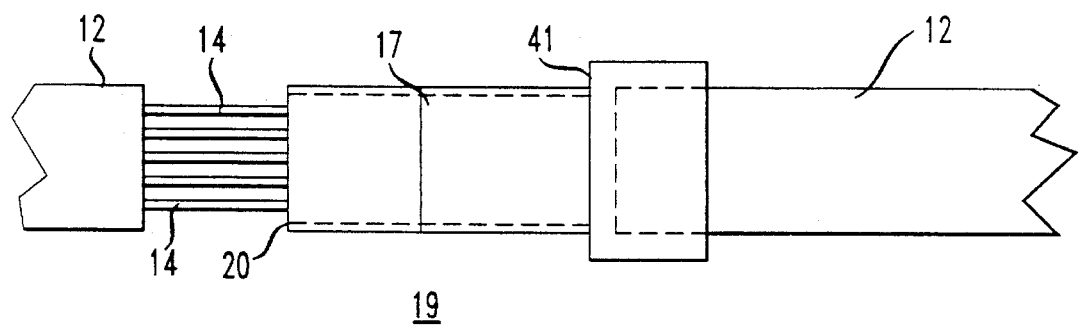
FIG. 3 is a view taken along lines 3—3 of FIG. 2.
Figure 4:
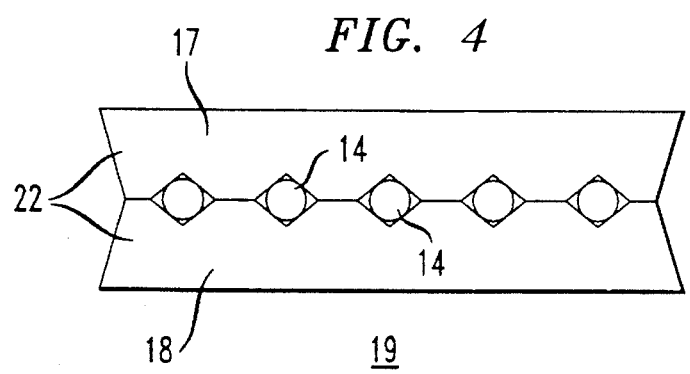
FIG. 4 is a fragmentary front view of the connector of FIGS. 2 and 3.

Referring to FIGS. 2 and 3, the purpose of the apparatus of FIG. 1 is to clamp, on opposite sides of each array of optical fibers 14, a pair of optical support members 17 and 18, which together constitute an optical fiber connector 19. As can be seen in FIG. 4, matching V-grooves in support members 17 and 18 support individual optical fibers 14. After the support members have been bonded on opposite sides of the optical fiber array, the fibers are severed at a front end 20 of the optical fiber connector, and the fibers are polished to be flush with the support members 17 and 18. Thereafter, the connector 19 can be abutted against another connector using alignment pins bearing against reference surfaces 22 (FIG. 4) formed in the sides of support members 17 and 18. The alignment pins can be held with a spring clip, as is described, for example, in the U.S. patent of Bonanni, U.S. Pat. No. 4,818,058, granted Apr. 4, 1989, incorporated by reference herein.

Referring again to FIG. 1, the optical fiber support members are placed on opposite sides of the fiber arrays by a pair of vacuum chucks 24 and 25. At the beginning of a cycle of operation, the chucks 24 and 25 are located on opposite sides of an aperture 26 in a table 27, upon which plate 16 is mounted. The support members (not shown in FIG. 1) are mounted in magazines 29 and 30. The vacuum chucks 24 and 25 are moved vertically together on opposite sides of the aperture 26, and a pair of optical fiber support members are urged toward the aperture 26 by either an arm 33 extending into magazine 29, or an arm 34 extending into magazine 30. The pair of support members are slid along a groove 35 between one of the magazines and aperture 26 into an opening defined by grooves 40 in the vacuum chucks 24 and 25. As they receive the support members, the vacuum chucks are connected by switches 36 to vacuum sources 38, which make the support members adhere to the vacuum chucks.

Next, the chucks are moved vertically in the Z direction away from the aperture 26. The table 27 is moved to the left to place one of the arrays of fibers 14 between vacuum chucks 24 and 25. The vacuum chucks are then moved vertically together to clamp the support members on opposite sides of an array of fibers, as is described generally in the aforementioned Roll et al. application. An adhesive bonds the two support members together so that they form the connector 19 shown in FIG. 2.

Figure 5:
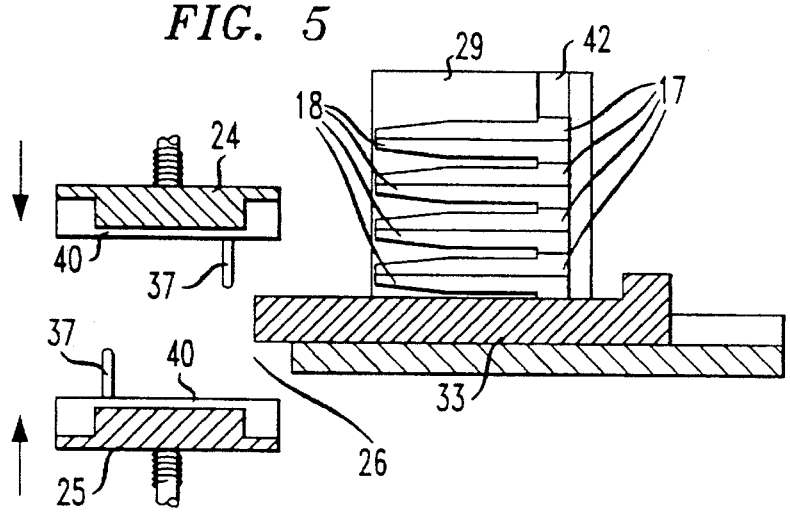
FIGS. 5–9 are schematic side views of one of the magazines and a pair of vacuum chucks or fixtures of the apparatus of FIG. 1 at successive time increments of a cycle of operation of the apparatus of FIG. 1.

FIGS. 5–9 illustrate in detail the successive steps of one complete cycle of operation for loading a pair of support members in a pair of vacuum chucks. Referring to FIG. 5, a plurality of pairs of optical fiber support members 17 and 18 are first loaded in the magazine 29. As shown in FIG. 3, each of the support elements has a step portion 41 which fits into a groove 42 of the magazine 29. Grooves 42 are also shown in FIG. 1. The grooves 42 maintain the support members 17 and 18 in the vertically stacked position shown in FIG. 5. Initially, the bottom-most support member 18 rests on an arm 33 which extends into the magazine. The vacuum chucks 24 and 25 are brought together (as shown by the arrows) in proximity to the magazine 29 on opposite sides of the aperture 26 (see also FIG. 1).

Figure 6:
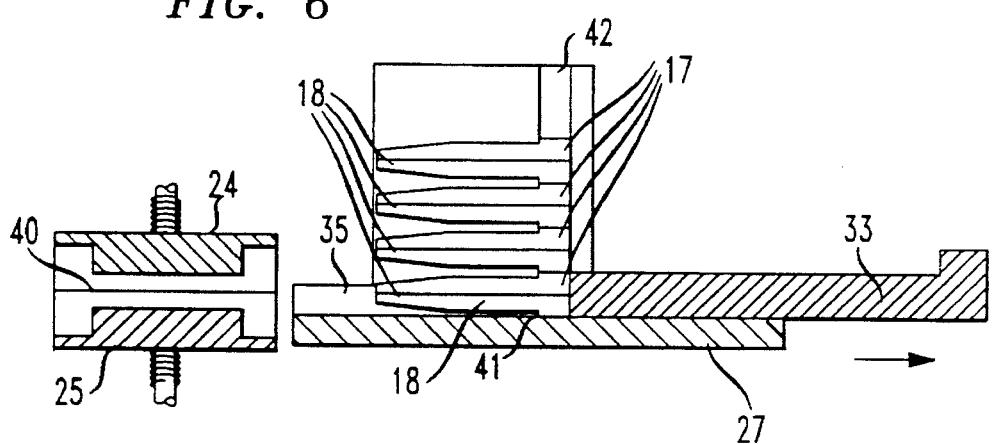

Referring to FIG. 6, during the next portion of the cycle, the arm 33 is retracted from the magazine, causing the support members 17 and 18 to move vertically downwardly by gravity, as shown by the arrow, so that they rest within a groove 35 of the table 27. The groove 35 is also shown in FIG. 1. The groove 35 is sufficiently wide to contain the entire widths of support members 17 and 18, including step portions 41. The vacuum chucks 24 and 25 are brought together at this time, but no vacuums are applied to the vacuum channels. As is described in the aforementioned Roll et al. application, alignment pins 37 of the vacuum chucks 24 and 25 each fit into an alignment aperture of the opposing vacuum chuck to aid in alignment of the vacuum chucks. It is assumed that each pair of optical support members 17 and 18 also has an alignment aperture and an alignment projection for insuring their alignment, as described in the Roll et al. application; for conciseness, such alignment projections and apertures have not been shown. Such features keep the support members in alignment in the magazine 29, as well as aiding in alignment when applied to a fiber array.

Figure 7:
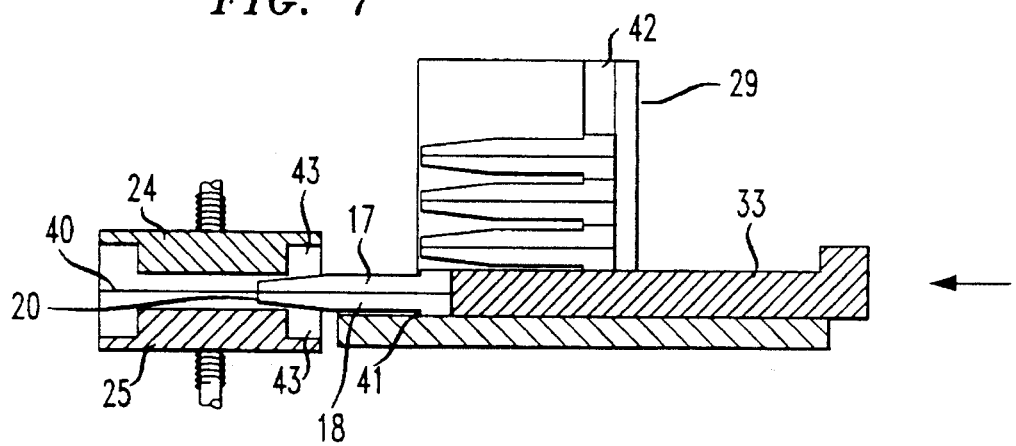

Referring to FIG. 7, the arm 33 is next moved to the left, as shown by the arrow, to force a pair of support members 17 and 18 into the space between the vacuum chucks 24 and 25 formed by grooves 40. The arm 33 has a thickness greater than that of one support member, but not more than that of two support members, so that it abuts and pushes two support members 17 and 18. A front surface 20 of the support members 17 and 18 is first pushed between the vacuum chucks; for reference, such front surface 20 is shown in FIG. 2. The surfaces of the pair of support members leading from surface 20 are preferably tapered slightly, as shown, to assist in sliding them into the gap formed by grooves 40. The chucks 24 and 25 include step portions 43, which are adapted to engage step portions 41 of the support members when the support members 17 and 18 have been completely slid to the left.

Figure 8:
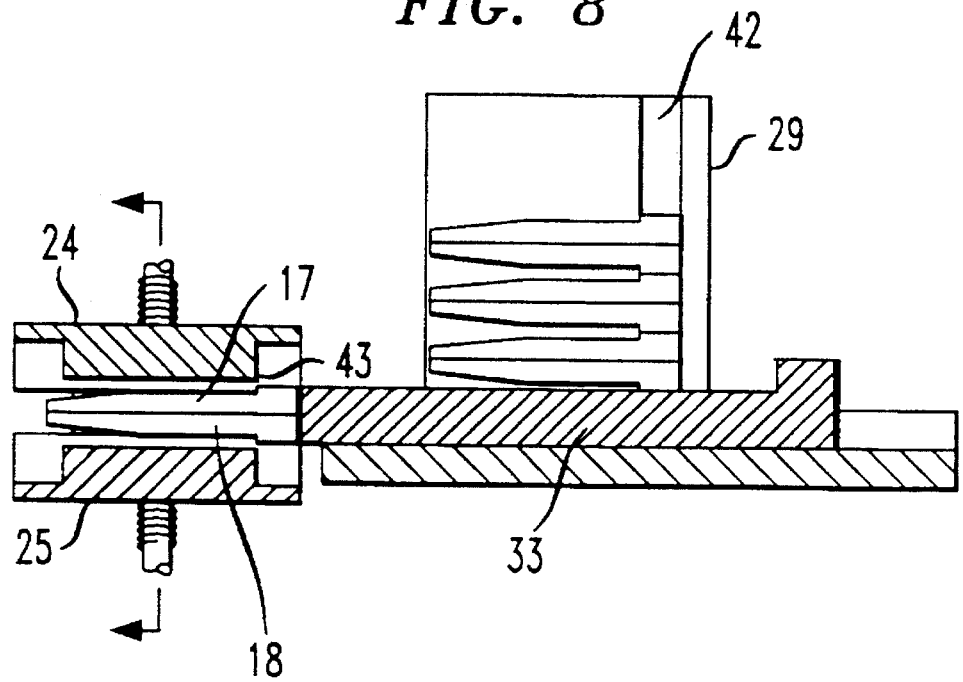

Referring to FIG. 8, the arm 33 is shown as being fully extended so as to force the steps 41 of the support members against the steps 43 of the vacuum chucks. At this point, the vacuum sources 38 of FIG. 1 are connected by switches 36 to provide a vacuum to the vacuum chucks 24 and 25, as indicated schematically by the arrows of FIG. 8.

Figure 9:
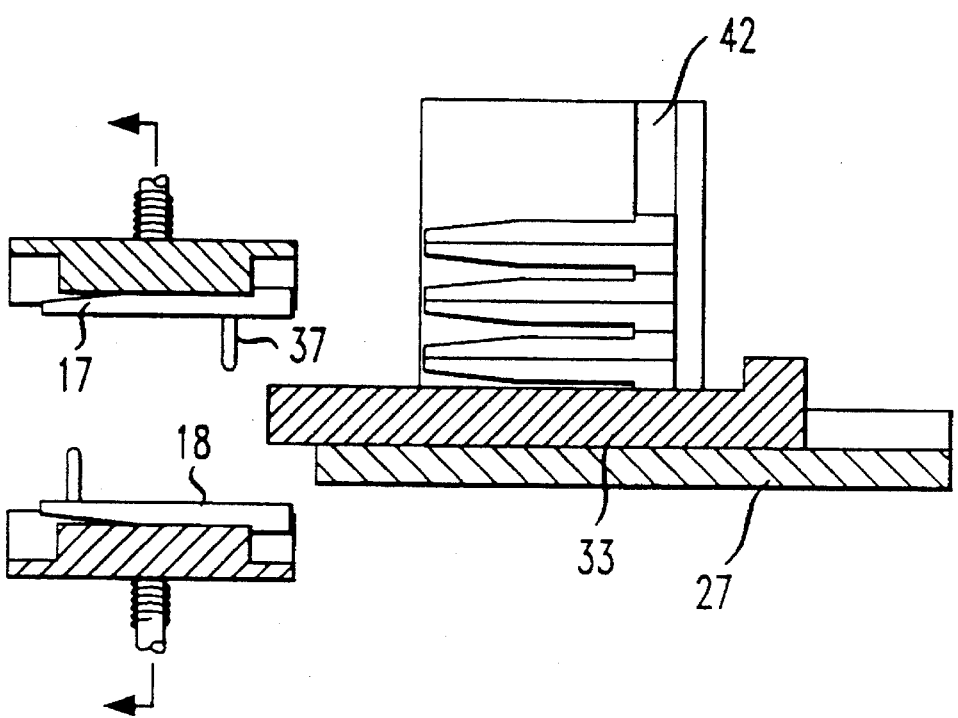

Referring to FIG. 9, the vacuum chucks 24 and 25 are next withdrawn, as shown, with the support members 17 and 18 adhered to them through the application of the vacuums. The vacuum chucks are withdrawn sufficiently from the aperture 26 shown in FIG. 1 so that the table 27 of FIG. 1 can move to the left to place an array of fibers 14 between the chucks. After application of the optical fiber support members 17 and 18 to the optical fibers as described before, the vacuum to the vacuum chucks 24 and 25 is released. During this time increment, the arm 33 is withdrawn to the position shown in FIG. 5 preparatory for the next cycle of operation; that is, preparatory to the placement of the next pair of optical fiber support members by the vacuum chucks on another optical fiber array.

The process described allows a worker to fill magazine 29 with a plurality of pairs of optical fiber support members 17 and 18 for successive automatic application to the vacuum chucks 24 and 25. As described in the Roll et al. application, making the support members of plastic allows them to be shaped to have appropriate tapers, stepped surfaces and alignment components, which in turn make automatic handling feasible; that is, such handling is not feasible with silicon support members of the prior art. In the fabrication of large numbers of identical optical fiber connectors, this is clearly an improvement over manual applying of the support members to the vacuum chucks.

The appropriate electrical motors, apparatus control circuitry and the like used for placement of the support members on the optical fibers are well known and therefore have not been described in detail. The table 27 of FIG. 1 was part of an X–Y stage which moved it in an X direction, such that aperture 26 or an appropriate optical fiber array 14 was between the vacuum chucks 24 and 25 during appropriate segments of the cycle of operation. For convenience, the centers of aperture 26 and opening 15 were located along a common X-direction line. X–Y stage apparatus is available, for example, from the Aerotech Company of Pittsburgh, Pa., U.S.A. A pair of Z-axis stages were also obtained from Aerotech for operating the vacuum chucks in a Z direction as shown. Appropriate control apparatus for controlling the timed movement of arms 33 and 34, the X–Y and Z stages, the vacuum switches and the vacuum chucks are also available, for example, from Aerotech. Of course, other machines could be used in which the vacuum chucks 24 and 25 are moved in an X–Y direction, as well as the Z direction for proper placement. A computer is preferably used for timing the control signals and for controlling X-direction movement of the X–Y stage to allow connectors to be applied to different optical fiber arrays.

For the reasons mentioned, the front ends 20 of all of the connectors 19 of FIG. 2 face the same direction when they are stacked in magazine 29. To provide a supply of connectors facing the opposite direction, a magazine 30 (FIG. 1) was provided. Thus, pairs of support members were accessed from either of the two magazines depending upon which direction the connector was to face after being placed on an optical fiber array 14.

The Roll et al. application also describes a version in which each pair of co-molded, double length connectors, after being placed on the optical fiber array, can be sliced through its middle to make two pairs of connectors facing each other. Appropriate designs of the magazines and the apparatus to provide optical fiber support members of this type can be made by those skilled in the art. The fixtures 24 and 25 could use methods for grasping support members other than the applied vacuums that have been shown. The ribbons or optical fiber backplane can be initially made with encapsulation or substrate gaps for accepting optical fiber connectors, which would obviate the need for an encapsulation removal step. Springs could be used for biasing the optical fiber support members 17 and 18 toward the table 27, rather than relying on gravity. Various other embodiments may be made by those skilled in the art without departing from the spirit and scope of the invention.

We claim:

1. A method for applying optical fiber support members to an array of optical fibers comprising the steps of: using a pair of fixtures to hold a pair of optical fiber support members each having an array of grooves; using the pair of fixtures to clamp the optical fiber support members on opposite sides of an array of optical fibers such that each optical fiber is contained within matching grooves of the two support members; wherein the improvement comprises:

arranging the optical fiber support members in a magazine;

bringing the fixtures into proximity with the magazine;

urging optical fiber support members from the magazine onto the fixtures;

and thereafter causing the support members to adhere to the fixtures.

2. The method of claim 1 wherein:

the optical fiber support members are arranged in a magazine in pairs, with the grooves of each pair of optical fiber support members facing each other;

and an arm projects into the magazine to move a pair of the optical fiber support members from the magazine to a space between the fixtures of the pair of fixtures.

3. The method of claim 2 wherein:

during the step of urging the optical fiber support members from the magazine onto the pair of fixtures, no vacuum is applied to the fixtures;

and, as the optical fiber support members are moved to the space between the fixtures, a vacuum is applied to the fixtures to cause the optical fiber support members to adhere to the fixtures.

4. The method of claim 3 wherein:

the optical fiber support members are vertically stacked in the magazine;

the arm slides a lowermost pair of said optical fiber support members horizontally into the space between the pair of fixtures;

and thereafter, the arm is withdrawn from the magazine, allowing the stack of optical fiber support members to move vertically downwardly by gravity.

5. The method of claim 4 wherein:

after the fixtures have been used to clamp the optical fiber support members on opposite sides of the array of optical fibers, the fixtures are returned to a location in proximity to the magazine;

and thereafter, the arm is used successively to move another pair of optical fiber support members onto the pair of fixtures for successive application to another optical fiber array.

6. The method of claim 5 wherein:

before the fixtures are returned, the vacuum is released;

and, after successive use of the arm, the vacuum is reapplied.

7. The method of claim 2 wherein:

the pair of optical fiber support members have thereon a step portion;

the fixtures have thereon a second step portion;

and the step of moving the optical fiber support members comprises the step of abutting the first step portion against the second step portion.

8. The method of claim 2 wherein:

the magazine has a first groove;

and the step of arranging the optical fiber support members in said magazine comprises the step of engaging a step portion of the optical fiber support members with said first groove.

9. The method of claim 8 wherein:

the magazine is supported by a table;

the table defines an edge, with a second groove interconnecting the edge and the magazine;

and the step of moving the optical fiber support members comprises the step of moving the optical fiber support members along the second groove to the edge of the table.

10. The method of claim 9 wherein:

the edge forms part of an opening in the table;

a second magazine is included in proximity to the opening opposite said magazine;

a third groove interconnects the second magazine and the opening;

second optical fiber support members are arranged in the second magazine;

and, from time to time, pairs of second optical fiber support members are urged by a second arm to the third groove and thence to the opening, and are caused to adhere to the fixtures.

11. Apparatus for applying optical fiber support members to arrays of optical fibers comprising: first and second fixtures each adapted to hold therein an optical fiber support member having an array of grooves; means for forcing together the fixtures on opposite sides of an array of optical fibers such that each optical fiber is supported within matching grooves of two support members; wherein the improvement comprises:

means comprising a magazine for holding a plurality of optical fiber support members in proximity to said first and second fixtures;

means for urging optical fiber support members from the magazine onto the fixtures;

and means for causing the support members to adhere to the fixtures.

12. The apparatus of claim 11 wherein:

the optical fiber support members are adapted to be arranged in said magazine in pairs, with the grooves of each pair of optical fiber support members facing each other;

and the urging means comprises an arm adapted to project into the magazine to move a pair of the optical fiber support members from the magazine to a space between said first and second fixtures.

13. The apparatus of claim 12 wherein:

said means for causing the support members to adhere to the fixtures comprises means for selectively applying a vacuum to said first and second fixtures, whereby, as the optical fiber support members are moved to the space between the first and second fixtures, a vacuum may be applied to the first and second fixtures to cause the optical fiber support members to adhere to the first and second fixtures.

14. The apparatus of claim 13 wherein:

the optical fiber support members are adapted to be vertically stacked in said magazine;

said arm comprises means for sliding a lower-most pair of said optical fiber support members horizontally into the space between the first and second fixtures;

and thereafter, said arm is adapted to be withdrawn from the magazine, thereby to allow the stack of optical fiber support members to move vertically downwardly by gravity.

15. The apparatus of claim 14 wherein:

said first fixture has a first alignment pin adapted to fit into a first alignment aperture of the second fixture;

and the second fixture has a second alignment pin adapted to fit into a second alignment aperture of the first fixture.

16. The apparatus of claim 15 wherein:

each pair of optical fiber support members has thereon a first step portion;

each fixture has thereon a second step portion;

and the means for urging the optical fiber support members comprises means for abutting the first step portion of a pair of optical fiber support members against the second step portions.

17. The apparatus of claim 16 wherein:

the magazine has a first vertically extending groove adapted to engage a projection on each of the optical fiber support members.

18. The apparatus of claim 17 wherein:

the magazine is supported by a table;

the table defines an edge with a second groove interconnecting the edge and said magazine;

and the means for urging the optical fiber support members comprises means for moving the optical fiber support members along the second groove to the edge of the table.

19. The apparatus of claim 18 wherein:

the edge forms part of an opening in the table;

a second magazine is included in proximity to the opening opposite said magazine;

a third groove interconnects the second magazine and the opening;

second optical fiber support members are arranged in the second magazine;

and further comprising means for urging pairs of second optical fiber support members into the third groove and thence to the opening, thereby to cause them to adhere to the first and second fixtures.

* * * * *